United States Patent [19]

Okitsu

[11] Patent Number: 5,029,499
[45] Date of Patent: Jul. 9, 1991

[54] REMAINING BAR MATERIAL MACHINING METHOD FOR NC LATHE

[75] Inventor: Tomohiko Okitsu, Shizuoka, Japan

[73] Assignee: Star Micronics Co., Ltd., Shizuoka, Japan

[21] Appl. No.: 485,264

[22] Filed: Feb. 26, 1990

[30] Foreign Application Priority Data

Mar. 1, 1989 [JP] Japan .................................. 1-50704

[51] Int. Cl.$^5$ .............................................. B23B 3/00
[52] U.S. Cl. ...................................... 82/1.11; 82/124; 82/127; 82/129
[58] Field of Search ................ 81/1.11, 124, 126, 127, 81/118, 129

[56] References Cited

U.S. PATENT DOCUMENTS

| | | | |
|---|---|---|---|
| 3,703,112 | 11/1972 | Selby | 82/127 |
| 4,457,193 | 7/1984 | Matthey | 82/124 |
| 4,763,549 | 8/1988 | Hata et al. | 82/124 |
| 4,821,612 | 4/1989 | Myers | 82/1.11 |

*Primary Examiner*—Frederick R. Schmidt
*Assistant Examiner*—Lawrence Cruz
*Attorney, Agent, or Firm*—Koda and Androlia

[57] ABSTRACT

In a remaining bar material machining method, a plurality of works are taken from a continuous bar material on an NC lathe, and the remaining portion left at the end of the bar material is machined effectively. In the lathe in which both first and second headstocks are axially movable along the bed, the continuous bar material can be continuously machined with efficiency. At that time, to utilize the remaining portion left at the end of the bar material effectively without discarding it, this remaining bar material is transferred to the second headstock. An NC controller includes a main machining program and a remaining bar material machining program; when the remaining bar material has been transferred to the second headstock, the remaining bar material machining program is executed instead of the main machining program having hitherto been executed. During machining the remaining bar material on the second headstock, the first headstock is waiting in readiness for the machining of the next bar material.

13 Claims, 7 Drawing Sheets

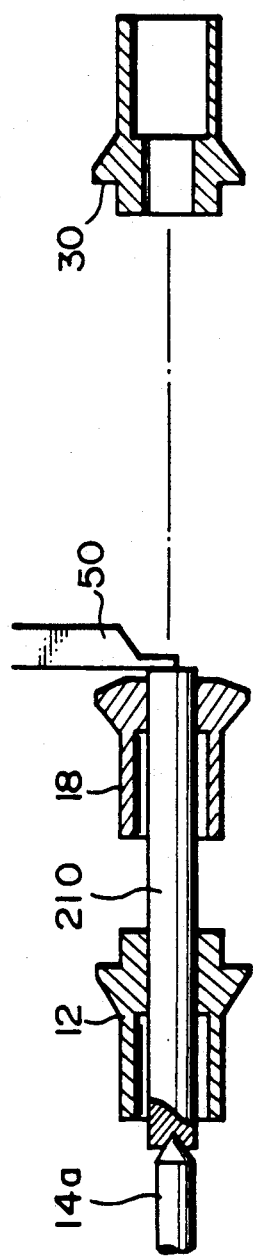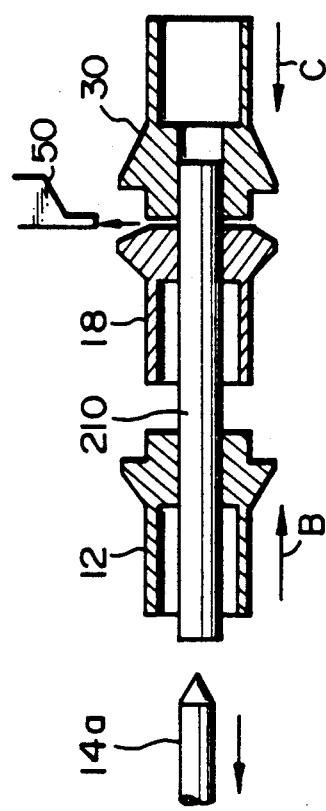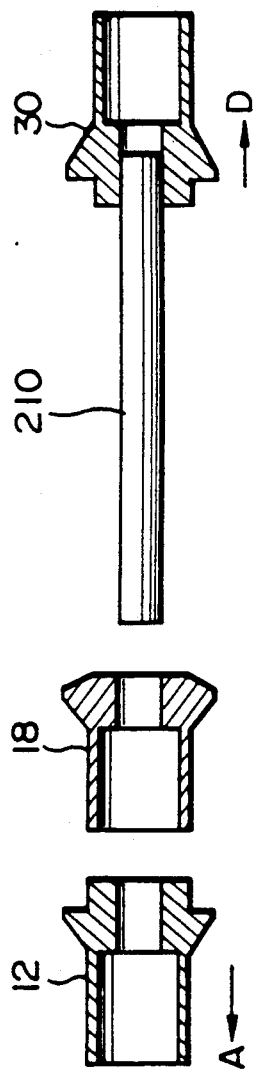

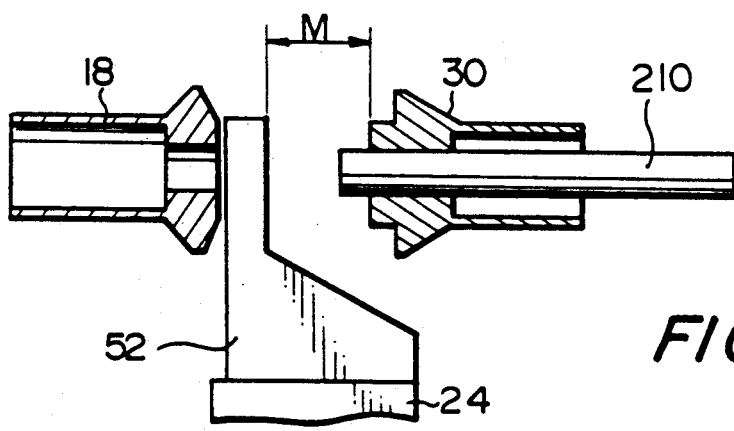
FIG.6A
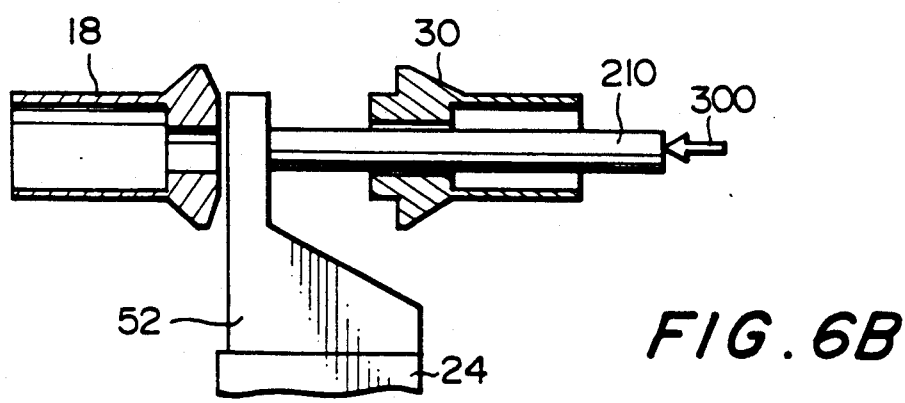
FIG.6B
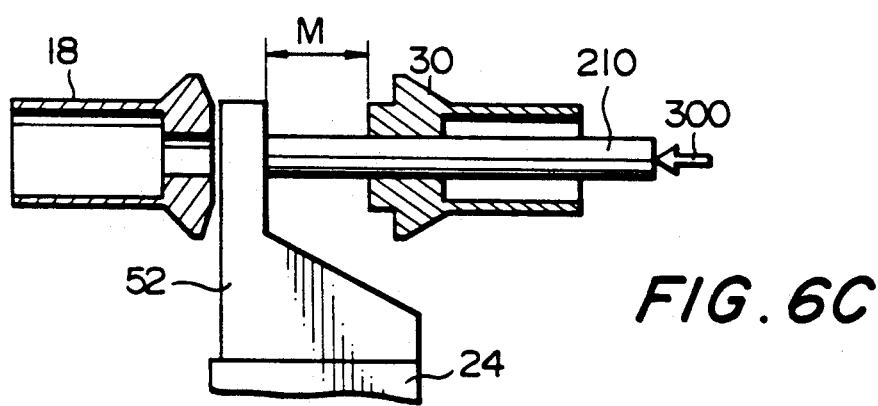
FIG.6C
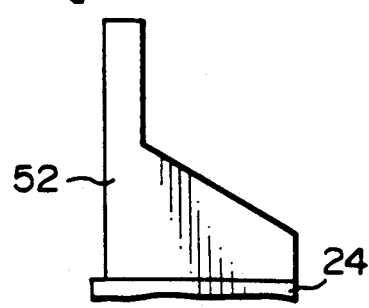
FIG.6D

REMAINING BAR MATERIAL MACHINING METHOD FOR NC LATHE

FIELD OF THE INVENTION

This invention relates to a remaining bar material machining method for an NC (Numerical Control) lathe, and more particularly to an improved machining method for effectively utilizing the remaining portion left at the end of a bar material while a plurality of works are taken from a continuous bar material.

DESCRIPTION OF THE PRIOR ART

Heretofore, NC lathes are known in which a cycle of machining operations, i.e. from chucking or gripping a bar material to multi-step turning of the bar material into a desired shape with a plurality of tools, which is then severed off, are virtually fully automated by computerized numerical control. The NC lathes accordingly constitute machine tools that are essential to modern machining in turning centers or the like.

In particular, NC lathes of the headstock sliding type, in which a headstock gripping the bar material gives a rotational drive to the bar material and slides on the bed along the axis of machining, have been popular as relatively small-sized and precise machining apparatuses.

In this type of NC lathes, the moving of the bar material along the axis of machining is assigned to the headstock, while the moving of the tools in the direction of cutting is assigned to the tool support. Due to the cooperation of the headstock and the tool support, a highly efficient machining can be performed. Specifically, since the headstock does all works from gripping of the bar material to forward moving of it while a number of works are being continuously taken from the bar material, an efficient continuous machining can be achieved.

When taking a plurality of works from the continuous bar material in such conventional NC lathe, it has been a common problem in discarding any remaining portion left at the end of the bar material in the final stage of machining.

FIG. 2 of the accompanying drawings shows the manner in which a plurality of individual bar materials of a length l are taken as works from a continuous bar material 100 (indicated by phantom lines) having a length L. At that time, due to the staggering length L of the continuous bar material itself and the individual bar material length l, a remaining portion having a length B and indicated by hatching would be left at the end of the bar material. In an ordinary NC lathe, the moving of the bar material is controlled by pushing the end portion of the bar material forwardly in the machining direction by a pusher rod, or by gripping the end portion of the bar material such as by a finger chuck. For this purpose, the remaining bar material B has a portion to be pushed by the pusher rod or to be gripped by the finger chuck, and therefore it has been a common practice to discard this remaining bar material B as a waste without making any machining.

Therefore the conventional NC lathe is disadvantageous in that the remaining portion of the individual bar material to be discarded as a waste is nothing but only wasteful, causing a reduced machining efficiency.

In the conventional NC lathe, the discharged remaining bar materials as packed in a magazine are supplied to a separate remaining-bar-material machining apparatus in an effort to have an effective use of materials. Thus, partly since a special remaining-bar-material machining apparatus is required, and partly since the remaining bar materials must be packed in a magazine every time they are supplied to the separate remaining-bar-material machining apparatus, which is laborious and time-consuming, it would sometimes be difficult to improve the total efficiency.

Further, as discussed above, the remaining bar material must be pushed forwardly in the machining direction by the pusher rod or must be returned to the bar material feeder by the finger chuck; the step for these procedures would share a considerable proportion of the total machining time, thus lowering the machining time efficiency.

Yet if a finger chuck for collecting the remaining bar materials is provided on the distal end of the feeder, it makes the structure of the feeder complex, causing an expensive NC lathe system.

SUMMARY OF THE INVENTION

It is therefore an object of this invention to provide an improved remaining-bar-material machining method in which any remaining portion left at the end of a continuous bar material can be effectively used as a work to be machined, causing an increased operation efficiency of an NC lathe.

According to this invention, there is provided a method of machining a remaining bar material in an NC lathe in which a bar material is supplied to a first headstock by a bar material feeder and then undergoes a predetermined machining by an NC controller, comprising the steps of: providing the NC controller with at least both a main machining program and a remaining bar material machining program; outputting a bar material-absence signal to the NC controller when the length of the remaining bar material supplied to the first headstock reduces to a predetermined value or less; switching the NC controller from the main machining program to the remaining bar material machining program by the bar material-absence signal; by the remaining bar material machining program, transferring the remaining bar material from the first headstock to a second headstock confronting the first headstock; and conducting the machining of the remaining bar material on the second headstock.

In this invention, as usual, the bar material is supplied to the first headstock by the feeder, and the NC controller takes the works during the maching of the main along its almost entire lengh.

Upon completion of a predetermined number of machinings for the main, or when the length of the remaining bar material is less than the length necessary for the machining of the main, a bar material-absence signal is issued to the NC controller. Upon receipt of the bar material-absence signal, the NC controller selects a predetermined or remaining bar material machining program, depending on the length of the remaining bar material, instead of the normal main machining program, so that the remaining bar material is transferred from the first headstock to the second headstock and is then gripped by the latter, whereupon a predetermined machining is conducted on the remaining bar material.

As mentioned above, partly since the effective use of materials can be achieved by setting the remaining bar material machining program, without leaving any remaining portion or with only a very short length of the remaining bar material, and partly since unlike the prior art it is unnecessary to return the bar material to the feeder, the machining efficiency can be improved remarkably, enabling a virtually continuous machining.

BRIEF DESCRIPTION OF THE DRAWINGS

FIGS. 3A-3C, 4, 5A-5D, 6A-6D and 7A-7C show the mode of operation of this method;

DETAILED DESCRIPTION

Figure 1:
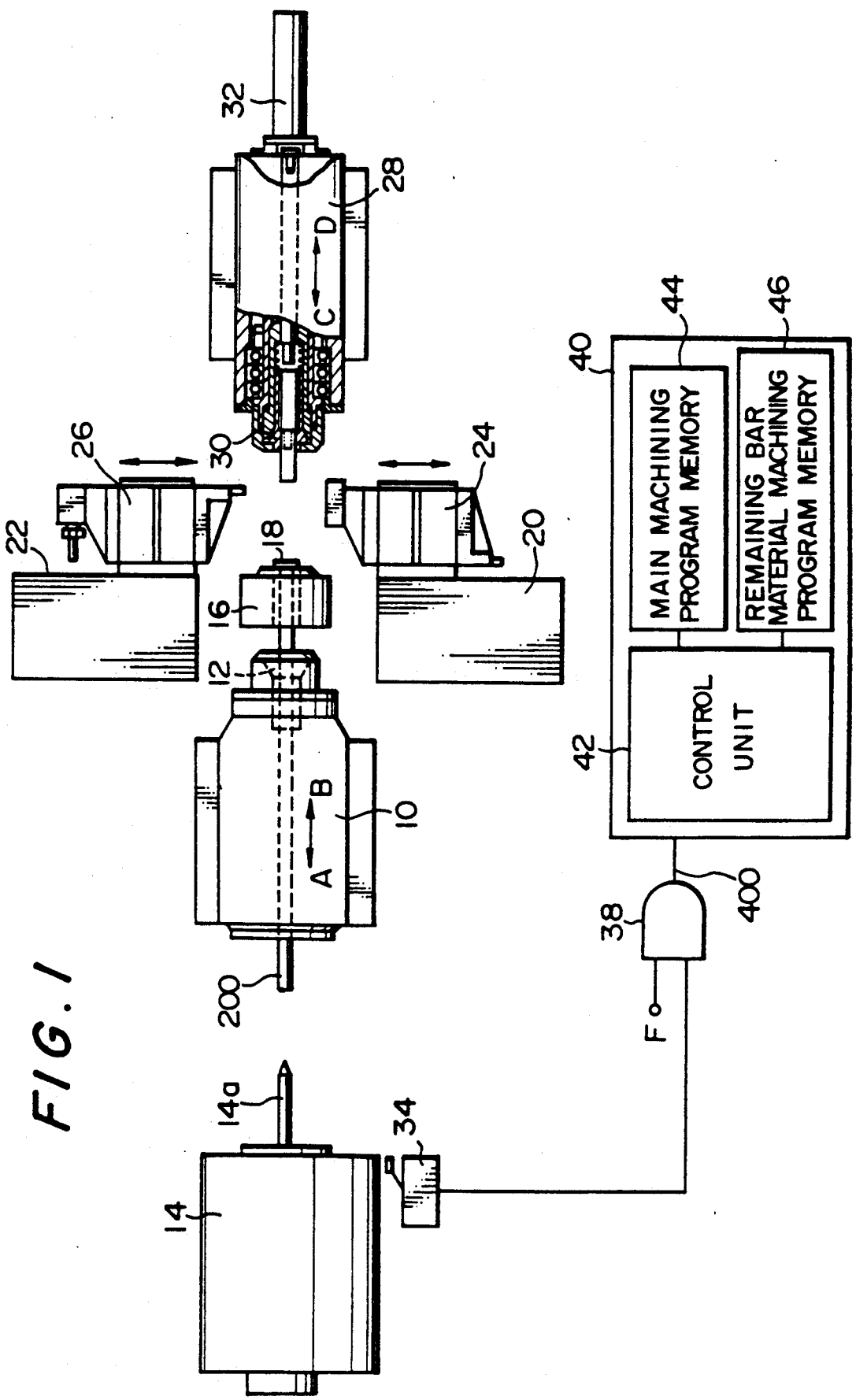
FIG. 1 is a schematic view showing an NC lathe to which a remaining bar material machining method of this invention is applied.
Figure 2:
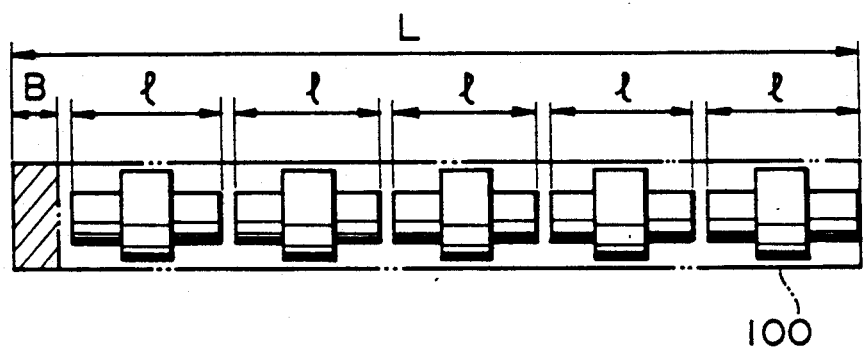
FIG. 2 shows the manner in which a continuous bar material is machined.

The principles of this invention are particularly useful when applied to an NC lathe such as shown in FIG. 1. This NC lathe is a headstock sliding type in which a first headstock 10 for performing a front machining slides on a non-illustrated bed along the machining axis A-B, during which time the end (to be machined) of a continuous bar material 200 is supported by a guide bush 18.

The first headstock 10 is reciprocatingly driven on the bed in the direction of arrows A, B to move the bar material 200 as gripped by a collet chuck 12.

The bar material 200 is moved forwardly by a bar material feeder 14 every time each work is taken, during which time the collet chuck 12 is opened.

A guide bush device 16 is fixed on the bed; the position of the front maching of the NC lathe is defined by the right end of the guide bush 18 of the guide bush device 16. The guide bush 18 may support the bar material 200 rotatably and slidably, or may be a rotary bearing rotatable with the bar material 200.

As is well known in the art, an X tool support 20 and a Y tool support 22 are mounted on the bed, and a turret 24, 26 rotatably supported on each of the tool supports 20, 22 can be indexed and detachably holds a plurality of tools. With the bar material end slightly projecting from the guide bush 18 and thus with the short overhang, the remaining bar material can be machined with high precision.

The machining method of this invention further uses a second headstock 28 supported on the bed in confronting relation to the first headstock 10. Like the known second headstock, this headstock 28 is provided with a collet chuck 30 for gripping the bar material. In the illustrated embodiment, the collet chuck 30 is a rotary chuck which is capable of giving the driving force to the bar material 200 when the remaining bar material is machined.

A fluid cylinder 32 is provided at the right end (remote from the first headstock 10) of the second headstock 28; it is a common practice to use fluid pressure to control the forward moving of the bar material gripped by the collet chuck 30.

The second headstock 28, like the first headstock 10, is slidable on the bed in the direction of arrows C, D. The rear machining, during front machining, and the remaining bar material machining, during the front machining, are performed with the machining tools mounted on the turrets 24, 26 as the second headstock 28 is moved under control.

In FIG. 1, when the axial position of the feeder 14 is detected by a detector 34, a bar material-absence signal 400 can be issued.

Specifically, the detector 34 detects the end of movement of the feeder 14 to the NC lathe, i.e., the end of forward stroke of a pusher rod 14a carried by the feeder 14. When the detector 34 outputs a detection signal, the predetermined taking of a work has already been completed on the bar material 200 moved into the first headstock 10, leaving only the remaining bar material length.

In the illustrated embodiment, the output of the detector 34 is supplied, along with a one-cycle-machining-completion signal F, to an AND gate 38. When the two signals have been in ON state, a bar material-absence signal 400 is outputted to the NC controller 40 to perform the shifting of the machining program described below.

The one-cycle-maching-completion signal F is outputted every time a predetermined machining of the bar material 200 has been completed; this output timing depends on the machining conditions.

For example, if the main machining is to be completed only with the front machining by the first headstock 10, the one-cycle-machining-completion signal F is outputted when a work has been severed by cutting-off from the first headstock 10.

If the main machining includes both the front and rear machinings, the one-cycle-machining-completion signal F is outputted preferably when the work has been discharged from the second headstock 28 upon completion of the rear machining on the second headstock 28.

Then, when the feeder 14 is supplying the bar material 200 is being moved forwardly all the way by the feeder 14 at the end of machining, a bar material-absence signal 400 is outputted from the AND gate 38 based on both the one-cycle-machining-completion signal F and the output signal from the detector 34.

The NC controller 40 possesses in its interior a control unit 42, a main machining program memory 44, and a remainining bar material machining program memory 46.

The main machining program, like the conventional art, controls the machining by the first headstock 10 or controls the machining by the first and second headstocks 10, 28 so that the front machining or the front and rear machining is performed under this control. On the other hand, the remaining bar material machining program comprises a single or a plurality of programs and can selectively output the predetermined remaining bar material machining program or the remaining bar material machining program corresponding to the length of remaining portion of the bar material 200 so that the machining of the work identical with or different from one for the main machining is performed.

The remaining bar material machining method of this invention will now be described.

The ordinary main machining is conducted by taking a predetermined number of works from the bar material 200; for example, the bar material is shaped by the front maching, and then cutting-off is conducted, with the end portion of the bar material gripped by the collet chuck 30 of the second headstock 28, to complete the maining bar material machining. During that time, this main machining is controlled according to the contents of the main program memory 44 of the NC controller 40.

As a predetermined number of works are taken from the bar material 200 moved into the first headstock 10, a remaining bar material is left on the first headstock 10, at which time a bar material-absence signal 400 is outputted from the detector 34.

In the conventional art, the remaining bar material is discarded by pushing forwardly the remaining bar material in the direction of arrow B by the pusher rod 14a, with the collet chuck 12 of the first headstock 10 open, or by pulling back the remaining bar material toward the feeder 14 by the conventional finger chuck. In this invention, the remaining bar material is moved into the second headstock 28, instead of pulling back the remaining bar material.

FIGS. 3A through 3C show the manner in which the remaining bar material is transferred to the second headstock 28.

FIG. 3A shows the state in which taking of a work from the bar material 200 has been completed. At that time the remaining bar material 210 is gripped by a the collet chuck 12, and cutting-off is performed by a cutting-off tool 50 mounted on the turret 24 or 26. And the collet chuck 30 of the second headstock 28 is waiting at a position remote from the machining position.

FIG. 3B shows the state in which the cutting-off tool 50 and the collet chuck 12 are moved backwardly and forwardly, respectively, to push out the remaining bar material 210 from the guide bush 18. At that time the pusher rod 14a has already been retracted to supply the next bar material 200. And the end of the remaining bar material 210 is gripped by the collet chuck 30 of the second headstock 28.

As described above, when the cutting-off has been completed the bar material-absence signal 400 is supplied to the NC controller 40 which reads the remaining whrkpiece machining program from the memory 46, instead of the main machining program having been performed by that time.

FIG. 3C shows the state in which the collet chuck 12 of the first headstock 10 is open, while the collet chuck 30 of the second headstock 28 grips the remaining bar material 210 to pull it out in the direction of arrow D.

When the remaining bar material 210 has thus been pulled toward the second headstock 28, the machining of the remaining bar material 210 is performed by a suitable machining tool mounted on the turret 24 or 26 under the driving force of the second headstock 28.

In FIG. 3C, when the remaining bar material 210 has been transferred to the second headstock 28, the first headstock 10 is immediately returned in the direction of arrow A for preparation to start the next main machining. Then desired machining information based on the remaining bar material machining program is supplied to the second headstock 28 and the turrets 24, 26 to perform the remaining bar material machining.

At that time, as discussed above, the feeder 14 and the first headstock 10 make preparation for the next main machining, and upon termination of the remaining bar material machining by the second headstock 28, the next cycle of main machining is started, thus causing a remarkably improved machining efficiency.

Figure 4:
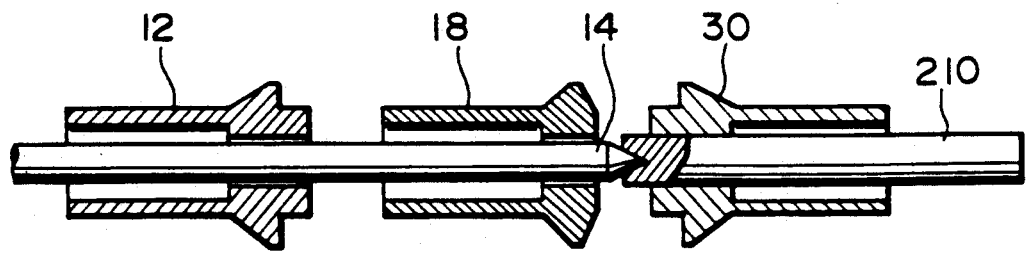

In the illustrated embodiment, the transfer of the remaining bar material 210 from the first headstock 10 to the second headstock 28 is performed by sliding of the collet chuck 12 mounted on the first headstock 10 slides. This transfer may be accomplished by an alternative optional way; for example, the remaining bar material 210 may be pushed into the collet chuck 30 of the second headstock 28 by the pusher rod 14a with the collet chucks 12, 30 of the first and second headstocks 10, 28, as shown in FIG. 4.

According to this invention, the remaining portion 210 of the bar material 200 moved into the first headstock 10 can be machined effectively by the second headstock 28. Various ways of correctly determining the length of remaining bar material 210 to be machined by the second headstock 28, i.e., the overhang amount of the remaining bar material projecting from the collet chuck 30 will now be described in greater detail.

FIGS. 5A through 5D show the manner in which the remaining bar material 210 is pushed out a predetermined amount from the collet chuck 30 by the fluid cylinder 32 as the collet chuck 30 is opened.

Figure 5A:
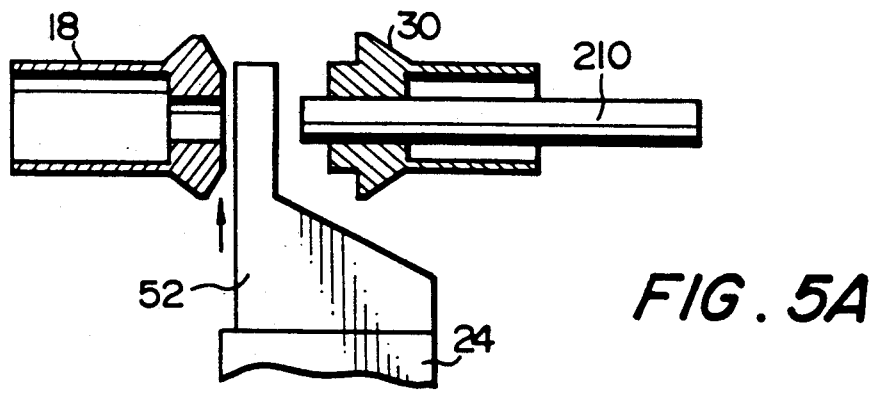

In FIG. 5A, the remaining bar material 210 pulled from the first headstock 10 to the second headstock 28 is gripped by the collet chuck 30, and a stop 52 held by the turret 24 is jutted into the axial line of the remaining bar material 210.

Figure 5B:
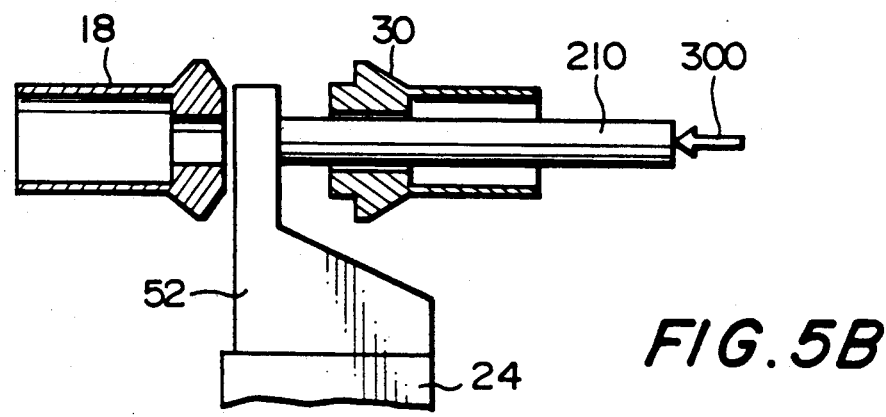

Then, as shown in FIG. 5B, the collet chuck 30 is opened so that fluid pressure 300 from the fluid cylinder is given to the remaining bar material 210. As a result, the left end of the remaining bar material 210 is brought in contact with the stop 52.

Figure 5C:
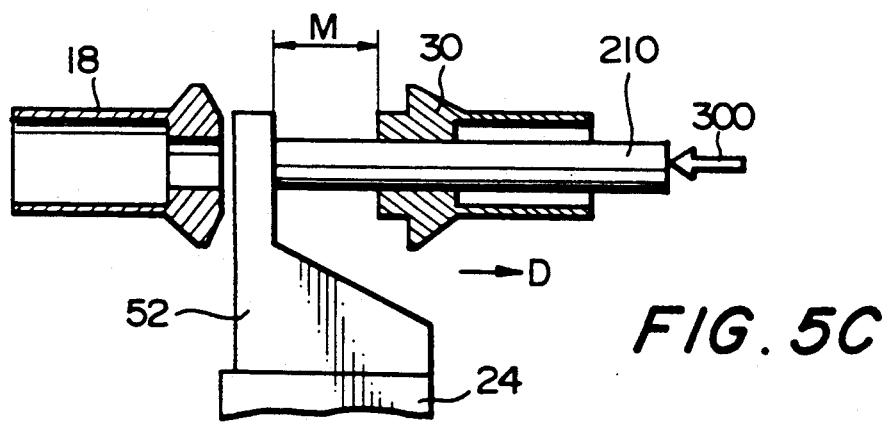

Subsequently, as shown in FIG. 5C, the collet chuck 30 is returned in the direction of arrow D to set the overhang amount M of the remaining bar material. At that time, since the fluid pressure is still exerted on the remaining bar material 210, it is possible to determine the overhang amount, i.e., the machining length M of the remaining bar material correctly according to the amount of return movement of the collet chuck 30. When the overhang amount M has been obtained, the collet chuck 30 is closed as show in FIG. 5C.

Figure 5D:
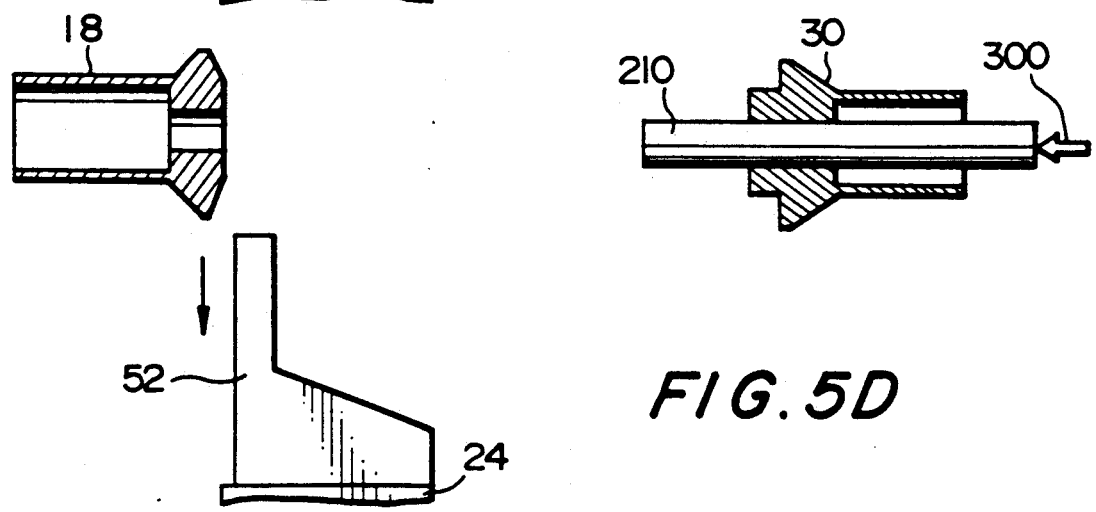

FIG. 5D shows the state in which the collet chuck 30, with the remaining bar material 210 gripped thereby, is returned to the machining position after the overhang amount M has been obtained. And the stop 52 is retracted from the axial line of the remaining bar material 210 so that a desired machining of the remaining bar material is conducted.

FIGS. 6A through 6D show the manner in which the overhang amount is set as approximately as in the manner of FIGS. 5A through 5D.

In FIG. 6A, the distance from the stationary position of the collet chuck 30, i.e., from the stop 52 is set to the overhang amount M. The collet chuck 30 is stopped at this position, whereupon the collet chuck 30 is opened so that the remaining bar material 210 is forced against the stop 52 under the fluid pressure 300.

FIG. 6C shows the state in which the collet chuck 30 is closed when a desired overhang amount M has been given, whereupon the collet chuck 30 and the stop 52 are retracted to complete preparation for a desired machining of the remaining bar material, as shown in FIG. 6D.

Figure 7A:
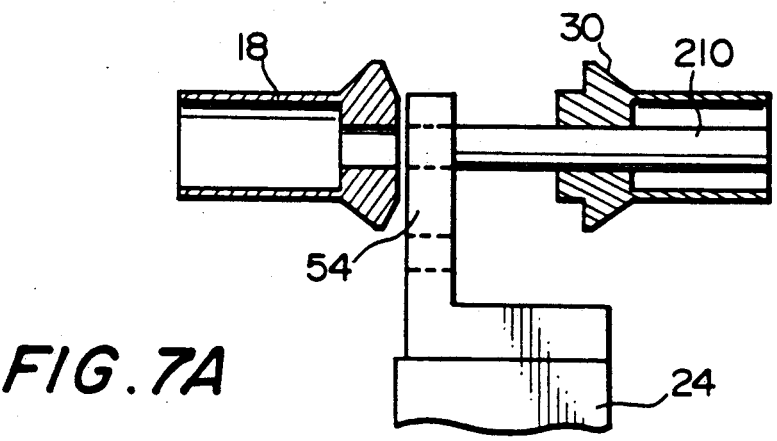
Figure 7B:
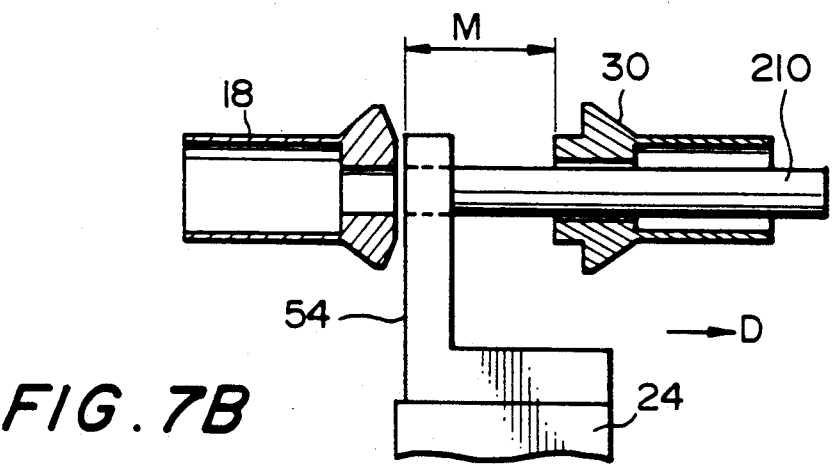
Figure 7C:
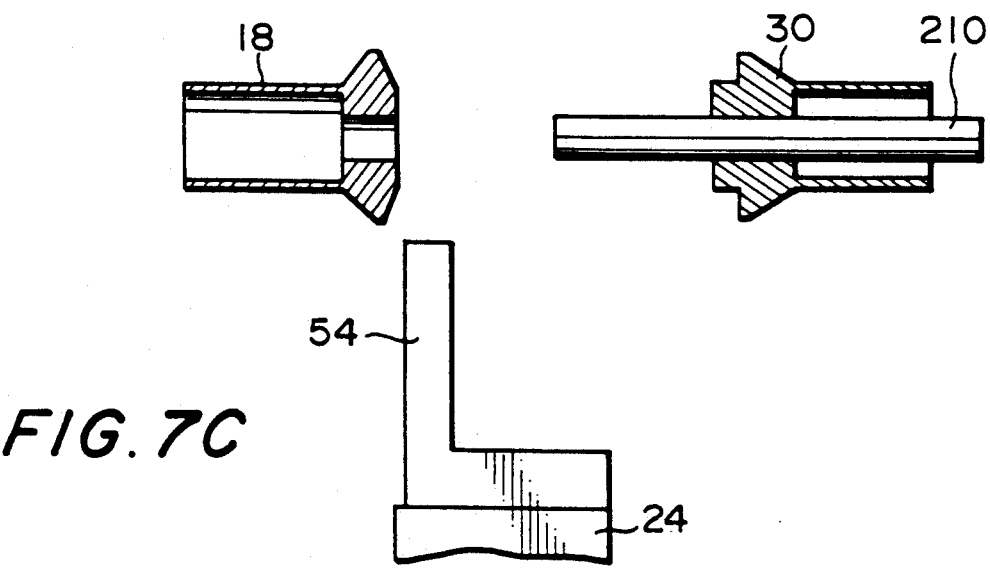

FIGS. 7A through 7C show another similar manner in which the overhang amount at the time of remaining bar material machining is set.

Figure 8:
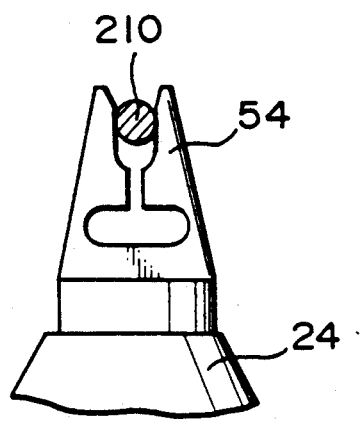
FIG. 8 is a detail view showing a holder used in this method.

The end of the remaining bar material 210 is gripped by a holder 54 mounted on the turret 24; this holder 54 can temporarily hold the remaining bar material 210 in a resilient fashion, as shown in FIG. 8.

FIG. 7A shows the state in which the collet chuck 30 brings the remaining bar material 210 forwardly to such a position that the end of the remaining bar material 210 is gripped by the holder 54.

Then, as shown in FIG. 7B, the collect chuck 30 assuming its open posture is moved backwardly in the direction of arrow D. At that time, since the end of the remaining bar material 210 is held by the holder 54, the remaining bar material 210 is kept stationary so that the only the collect chuck 30 is moved backwardly.

When a desired overhang amount M has been obtained, the collect chuck 30 is closed, whereupon the collect chuck 30 and the holder 54 are moved backwardly to complete preparation for the remaining bar material machining, as shown in FIG. 7C.

Figure 9:
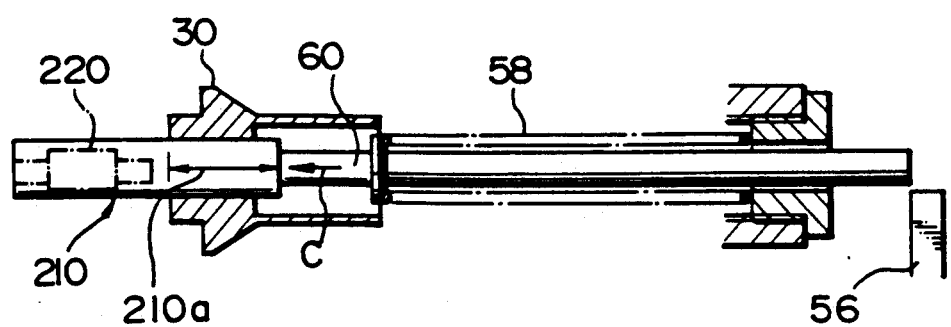
FIG. 9 shows the manner in which the remaining bar material is machined according to this invention.

In this invention, the remaining bar material machining may includes machining all or part of the remaining bar material. FIG. 9 shows the state in which a desired work 220 is machined from the remaining bar material 210, in which case a portion 210a of the remaining bar material 210 is discarded.

In FIG. 9, a plurality of works 220 are taken from the remaining bar material 210. A sensor 56 located at the rear side of the collect chuck 30 detects the state in which the machining of the final work has been completed, namely, no more machining of the remaining bar material is possible.

Specifically, the end of the remaining bar material 210 is urged in the pushing-out direction by a second pusher rod 60 which is normally urged in the direction of arrow C by a spring 58; therefore, as the collect chuck 30 is opened, the remaining bar material 210 is intermittently pushed out by a predetermined amount at a time.

The rear end of the second pusher rod 60 is monitored by the sensor 56; when the length of the remaining bar material 210 within the collect chuck 30 becomes shorter than a predetermined length, the sensor 56 is actuated to give to the NC controller a notice of completion of the remaining bar material machining.

Therefore, according to the embodiment of FIG. 9, it is possible to use the remaining bar material 210 with maximum effectiveness.

In the illustrated embodiments, the lathe of headstock sliding type is used. However, this invention should by no means be limited to this specific example; it may be a lathe of the type in which the tool support and the guide bush are slidable, with the headstock being fixed.

Further, in the main machining, works can be obtained by the front machining or by the front and rear machinings. The same can be said in the remaining bar material machining; for example, by providing a third headstock function, in addition to the second headstock, on part of the turrets, it is possible to obtain works by the combination of front and rear machinings.

According to this invention, a continuous bar material can be machined, on an NC lathe having the first and second headstocks, effectively without leaving any remaining portion or with leaving only a very slight length of remaining portion.

Further, partly since it is unnecessary, in the remaining bar material machining, for the feeder to pull back the bar material moved into the first headstock, and partly since it is unnecessary to provide any finger collect chuck at the side of the feeder, it is possible to make the entire structure of an NC lathe simple and to eliminate any waste time required for the pulling-back step.

Furthermore, since the first headstock makes preparation for the next main machining while the remaining bar material is being effectively machined by the second headstock, it is possible to minimize the entire machining cycle, thus causing a remarkably improved efficiency.

What is claimed is:

1. A method of machining a remaining bar material in an NC lathe in which a bar material is supplied to a first headstock by a bar material feeder and then undergoes a predetermined machining by an NC controller, comprising the steps of:
   providing the NC controller with a least both a main machining program and a remaining bar material machining program;
   executing the main machining for dividing the bar material, supplied to the first headstock, into a plurality of material pieces;
   outputting a bar material-absence signal to the NC controller when the length of the remaining bar material supplied to the first headstock reduces to a predetermined value or less;
   switching the NC controller from the main machining program to the remaining bar material machining program in response to the bar material-absence signal;
   by the remaining bar material machining program, transferring the remaining bar material from the first headstock to a second headstock confronting the first headstock; and
   executing the remaining bar material machining at this second headstock side.

2. A remaining-bar-material machining method according to claim 1, wherein the bar material-absence signal is provided by detecting a push-out position in which the bar material is pushed out by the bar material feeder.

3. A remaining-bar-material machining method according to claim 1, wherein the bar material-absence signal is detected when a predetermined number of material pieces have been taken from the bar material.

4. A remaining-bar-material machining method according to claim 1, wherein the transfer of the remaining bar material is performed by pushing the remaining bar material into the second headstock by the bar material feeder, with both collect chucks of the first and second headstocks being opened.

5. A remaining-bar-material machining method according to claim 1, wherein said machining of the remaining bar material includes taking a plurality of material pieces from the remaining bar material.

6. A remaining-bar-material machining method according to claim 1 wherein the bar material feeder starts supplying next bar material to a first headstock.

7. A remaining-bar-material machining method according to claim 6, wherein the first headstock is returned to its main machining start position after the remaining bar material has been transferred to the second headstock.

8. A method of machining a remaining bar material in an NC lathe in which a bar material is supplied to a first headstock by a bar material feeder and then undergoes a predetermined machining by an NC controller, comprising the steps of:
   providing the NC controller with at least both a main machining program and a remaining bar material machining program;
   executing the main machining for dividing the bar material, supplied to the first headstock, into a plurality of material pieces;
   outputting a bar material-absence signal to the NC controller when the length of the remaining bar material supplied to the first headstock reduces to a predetermined value or less;

switching the NC controller from the main machining program to the remaining bar material machining program in response to the bar material-absence signal;

by the remaining bar material machining program, transferring the remaining bar material from first headstock to a second headstock confronting the first headstock;

setting at a predetermined value the length of the remaining bar material projecting from the second headstock; and conducting the machining of the remaining bar material on the second headstock.

9. A remaining-bar-material machining method according to claim 8 wherein said setting of the length of the remaining bar material projecting from the second headstock is performed by;

jutting a stop into the axial line of the remaining bar material after the remaining bar material has been transferred to the second headstock;

setting the position of the second headstock in such a manner that the distance from the stop to a distal end of the second headstock is equal to a predetermined overhung extent;

releasing the remaining bar material from the second headstock, with the second headstock held in the predetermined position, and then moving the remaining bar material until it comes in contact with the stop; and again gripping the remaining bar material by the second headstock, with the overhung extent having been given.

10. A remaining-bar-material machining method according to claim 8, wherein said setting of the length of the remaining bar material projecting from the second headstock is performed by;

after the remaining bar material has been transferred to the second headstock, moving the remaining bar material held by the second headstock toward the axial line of the remaining bar material so that the axial line of the remaining bar material is held by the holder;

releasing the remaining bar material from the second headstock and then moving the remaining bar material axially until its length projecting from the second headstock reaches a predetermined value; and again gripping the remaining bar material by the second headstock.

11. A remaining-bar-material machining method according to claim 10, wherein the projected end of the remaining bar material is resiliently held by the holder.

12. A remaining-bar-material machining method according to claim 8, wherein said setting of the overhung extent of the remaining bar material projecting from the second headstock is performed by:

jutting a stop into the axial line of the remaining bar material after the remaining bar material has been transferred to the second headstock;

releasing the gripping of the remaining bar material at the second headstock and then pushing out the remaining bar material from the second headstock to come in contact with the stop;

moving the second headstock axially to a predetermined position, with pushing the remaining bar material against the stop; and again gripping the remaining bar material by the second headstock, with the second headstock held in the predetermined position.

13. A remaining-bar-material machining method according to claim 12, wherein fluid pressure is used to push the remaining bar material against the stop.

* * * * *